Aug. 19, 1958  R. Y. MOSS ET AL  2,848,569
AUTOMATION CONTROL DEVICE

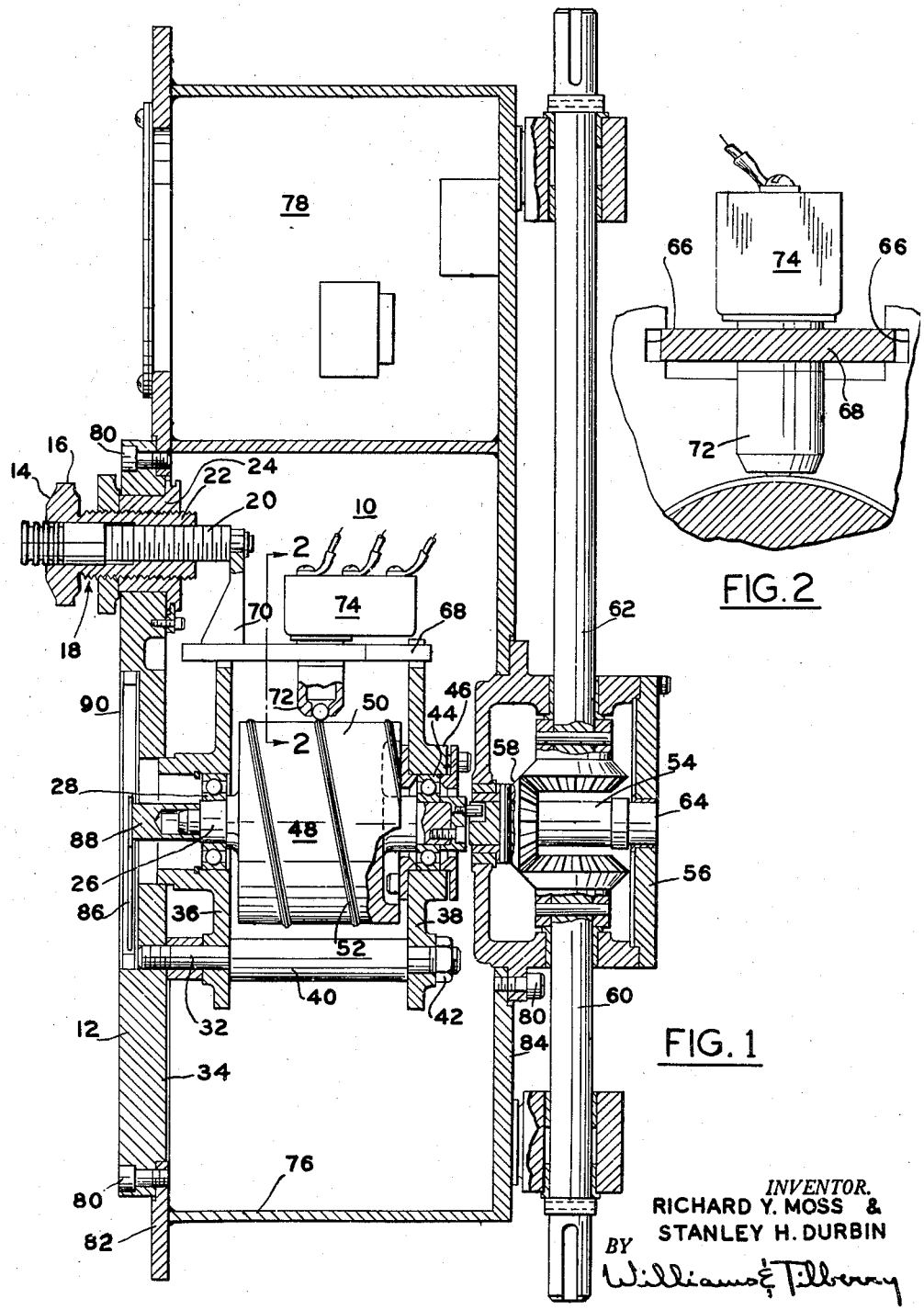

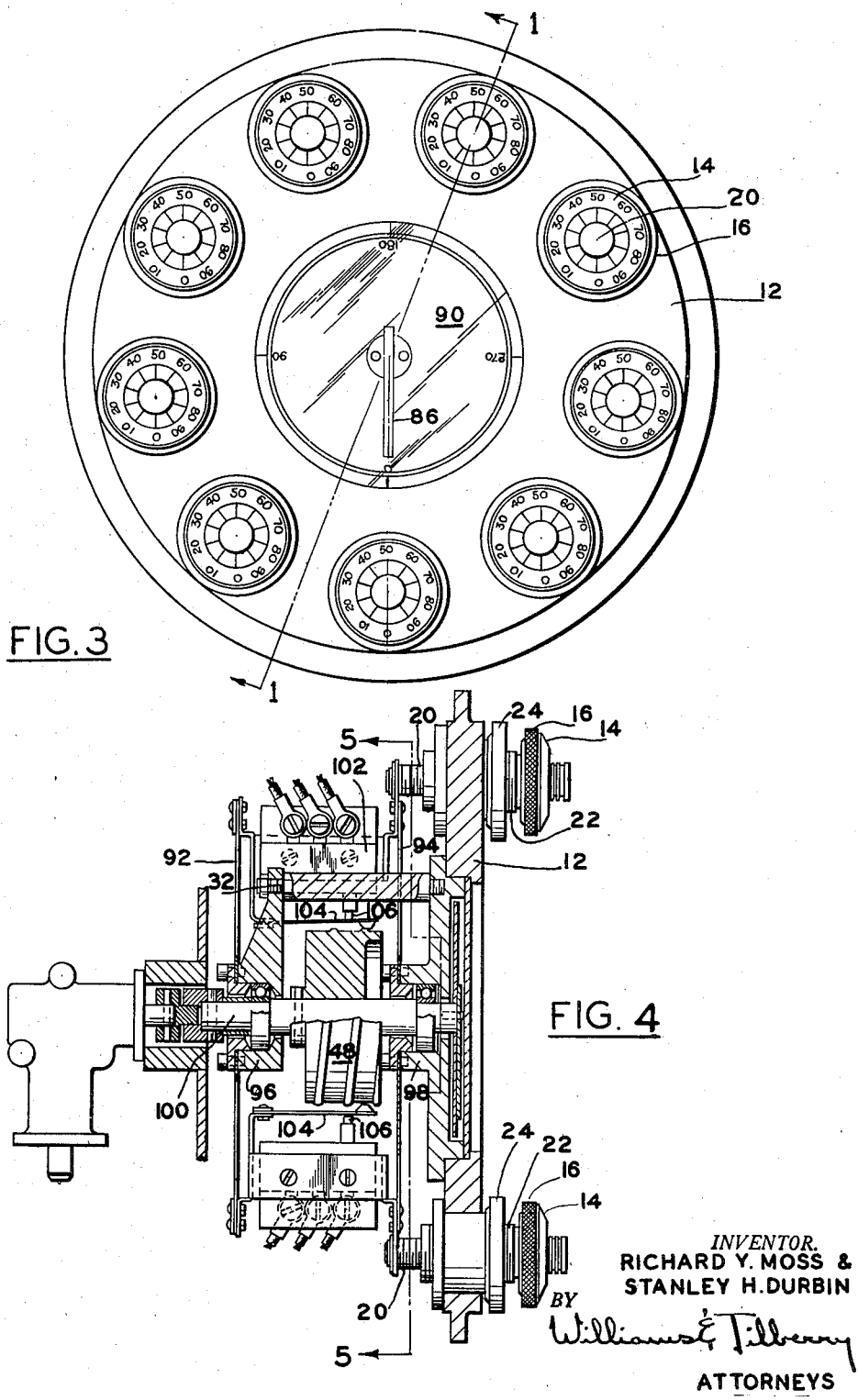

Filed May 10, 1955  3 Sheets-Sheet 3

INVENTOR.
RICHARD Y. MOSS &
STANLEY H. DURBIN
BY
Williams & Tilbury
ATTORNEYS

United States Patent Office 2,848,569
Patented Aug. 19, 1958

2,848,569

AUTOMATION CONTROL DEVICE

Richard Y. Moss and Stanley H. Durbin, Canton, Ohio, assignors to E. W. Bliss Company, Canton, Ohio, a corporation of Delaware Application May 10, 1955, Serial No. 507,224

8 Claims. (Cl. 200—27)

This invention relates, in general, to automation control devices, and, in particular, to control devices adapted to regulate industrial machines, such as power presses and the like, having repetitive cycles of operation.

Automation of industrial machinery requires that a multiplicity of operations on a workpiece be synchronized so that these operations are performed automatically in a predetermined sequential order. It is often desirable to synchronize ancillary operations on a workpiece with a principal operation of a lead machine. If the operation of the lead machine can be related to a 360° cycle, then ancillary operations can be synchronized with the principal operation in terms of degrees of the full cycle. In other words, while a principal operation is being performed on a workpiece during a 360° cycle, it is advantageous to start a sub-operation on the workpiece a predetermined number of degrees before or after the start of the main operation cycle, and a plurality of sub-operations may be initiated sequentially thereafter during the entire cycle of the main operation. Thus, it is not unusual for a single industrial power press to have synchronized to its principal function twenty or more sub-operations which are synchronously timed and controlled by the speed at which the main crankshaft of the press is operated. As the number of sub-operations which are controlled by a main operation increases, the requirement for precise synchronous timing of the sub-operations becomes increasingly important. It is quite necessary, therefore, that the means for controlling the sub-operations be very accurate, dependable, and readily adjustable while running, otherwise synchronism between multiple operations will not be maintained.

It is a primary object of this invention, therefore, to provide a novel automation control device which is adapted to control a plurality of sub-operations synchronous with the main operation of a machine in a dependable and accurate fashion.

Other objects of the invention include the provision of a control device adapted to regulate any desired number of sub-operations; a control device which is easily and accurately adjustable while the machine is in operation; a device which indicates, at all times, the timing of sub-operations with respect to a principal operation; a device which will control and actuate any number of sub-operations within a 360° cycle; a device which is rugged, dependable, accurate, and easily adjustable; and a device which is suitable for tandem operation with a plurality of similar automation control devices.

The features of this invention which are believed to be novel are set forth with particularity in the appended claims. The invention itself, both as to its organization and use, together with the foregoing and further objects and advantages thereof, may best be understood by reference to the following description taken in connection with the accompanying drawings in which:

Figure 1 is a sectional view of a preferred embodiment of the invention taken on the line 1—1 of Figure 3, and showing for illustrative purposes but one of a plurality of similar switching elements in operable contact with a centrally disposed helical cam.

Figure 2 is a fragmentary enlargement of a section taken on the line 2—2 of Figure 1, showing ways or slides which adjustably carry switching elements therein.

Figure 3 is a plan view of the dial face of the invention showing a plurality of regulating knobs radially aligned about the periphery of the dial, and also showing a sweep hand indicating means employed to assist in synchronizing the various switching elements employed in the invention.

Figure 4 is a sectional view similar to Figure 1 of a modified embodiment of the invention, and, Figure 5 is a sectional view of the modified embodiment of the invention shown in Figure 4, taken along the line 5—5 of Figure 4.

Figure 5:
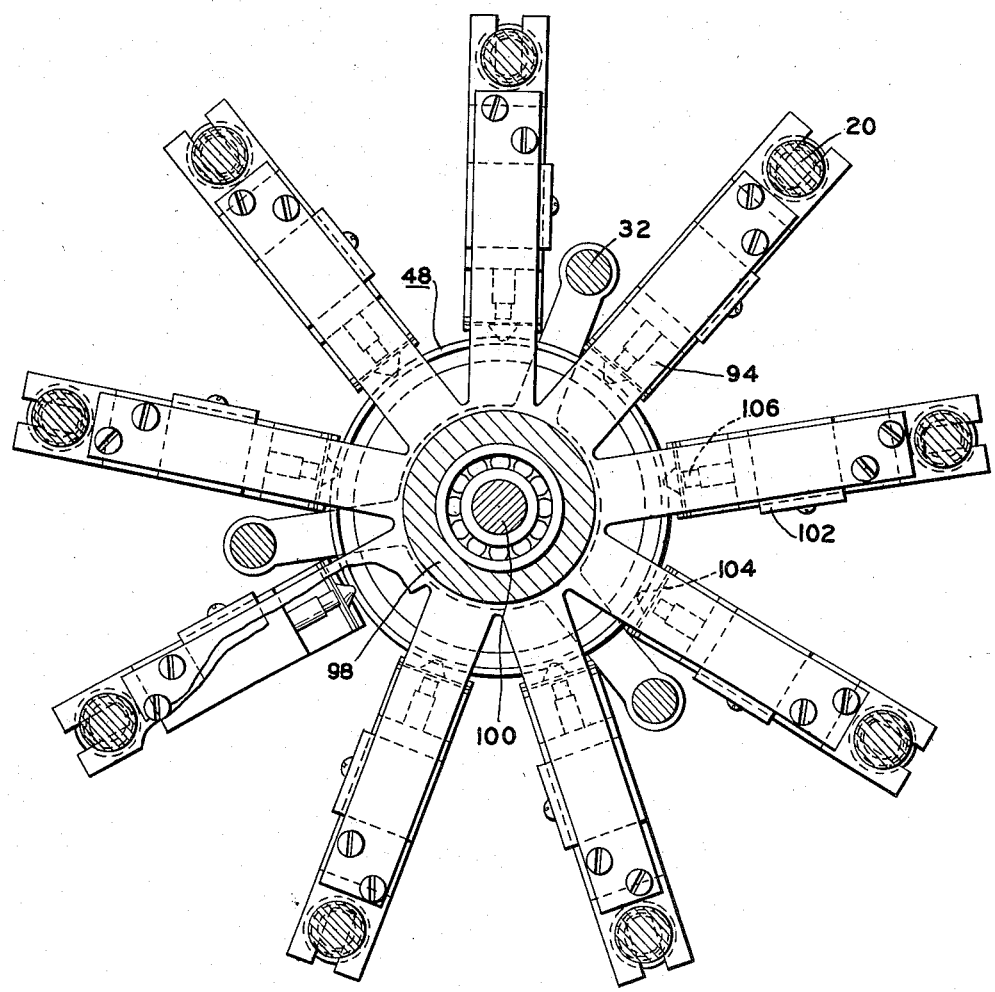

Reference is now made to the drawings in greater detail, and, in particular, to Figure 1. A preferred embodiment of the invention 10 comprises a base plate 12 (see also Figure 3) having a plurality of dials 14 radially positioned from the center of the base plate and substantially adjacent to its periphery. The dials can be provided with suitable indicia associated with corresponding markings of any desirable nature on the face of the base plate to indicate a degree of angular adjustment of each dial. The dials are placed on the outer faces of adjusting knobs 16 of micrometer-type adjusting mechanisms 18. These adjusting mechanisms 18 comprise a non-rotatable threaded stud 20 which is threadedly received in a sleeve 22 having O. D. threads and carrying the adjusting knob 16 on one end. The sleeve 22, in turn, is threadedly engaged within a non-rotatable bushing or sleeve 24 which is mounted in the base plate 12. It will be seen, therefore, that rotation of sleeve 22 within non-rotatable sleeve 24 and about non-rotatable stud 20 will cause the stud to advance or retract depending upon which direction the sleeve 22 is rotated. By providing threads of a different hand and of a different pitch on the stud 20 and the I. D. of the sleeve 22, than are provided on the O. D. of the sleeve 22 and the I. D. of the sleeve 24, a differential condition is established whereby adjustment of the knob 16 will produce a proportionately greater adjustment of the stud 20.

A shaft 26 is rotatably supported on its left end, as seen in Figure 1, in anti-friction bearings 28 concentric with the axis of the base plate 12. A series of studs 32 are threadedly engaged in the back side 34 of the base plate 12 and circularly arrayed about the axis of the base plate to support a spider 36 horizontally spaced apart from the base plate. A second spider 38 is carried on the studs 32 and spaced apart from the first mentioned spider by means of spacer sleeves 40. The second spider 38 is rigidly held on the studs 32 between the spacer sleeves 40 and nuts 42 threadedly engaged on the free ends of the studs. The opposite end of the shaft 26 is rotatably supported in anti-friction bearings 44 secured in the hub 46 of the spider 38.

A helical cam 48, comprising a cylindrical member 50 provided with a helical bead 52 integral with the exterior cylindrical surface of said cylindrical member is rotatably secured to the shaft 26. The shaft 26 is drivingly keyed by suitable means to a drive shaft 54 rotatably journaled in a gear box 56. The drive shaft 54, having a miter gear 58 carried thereon, may be driven by either of the miter gear shafts 60 or 62, by an in-line shaft connected at 64, or by any other suitable means, not shown. In addition to providing a drive means for shaft 26, the miter gear shafts are also provided for the purpose of connecting a plurality of control devices in tandem, and to be synchronously driven thereby.

Corresponding portions of spiders 36 and 38 are provided with ways 66 (see Figure 2) to slidably receive therein switching element mounting plates 68. An arm 70 is rigidly secured to each mounting plate 68 on one end, and at the other end to the micrometer adjusting stud 20. By turning the knob 16, it will be seen that the mounting plate 68 will be caused to slide in its ways 66 axially to the left or to the right, as seen in Figure 1. A cam follower 72 is provided with each switching element 74 to extend below the mounting plate 68 for engagement with the helical bead 52 once every revolution of the helical cam 48. The place in the cycle at which the switching element 74 will be actuated will depend on its position axially with respect to the helical cam 48, and, as aforesaid, this position is readily adjustable by means of the micrometer-type adjusting mechanism 18. Furthermore, since the cam 48 is in the form of a continuous helix, and any point on the helix can actuate the switching element 74, the point of actuation can be continuously and uninterruptedly adjusted along the full length of the cam. A sweep hand 86 is secured to an extension 88 of the shaft 26 and positioned to pass over the dial face 90 of the base plate so as to visually indicate the angular position of the cam 48 at all times. Any number of switching elements may be positioned radially about the helical cam subject only to cam peripheral space limitations.

The control device assembly 10 is mountable within a housing 76 to protect the device from damage due to dirt, shock, and the like, and also to provide terminal block means in the upper portion 78 for connecting the switching element wiring. The device is mounted in the housing by means of screws 80 passing through the base plate 12 into the front wall 82 of the housing 76, and like screws 80 rigidly securing the gear box 56 to the back wall 84 of the housing in axial alignment with the base plate 12.

A modified embodiment of the invention is shown in Figure 4 and is substantially similar to the above described embodiment with the exception of the microswitch mounting means. In this second embodiment, in lieu of ways 66 and mounting plates 68, pairs of reeds 92 and 94 are secured to opposite journal members 96 and 98 of helical cam shaft 100. Each reed 92 is secured at its base to journal member 96 and at its opposite end to a switching element 102. Each of the opposite reeds 94 is secured at its base to journal member 98 and at its opposite end to both the switching element 102 and the micrometer adjusting stud 20. Accordingly, it will be seen that to axially adjust the switching element with respect to the helical cam 48, micrometer stud 20 will be axially shifted, thereby flexing the reeds 92 and 94 to carry the switching element axially therebetween. To compensate for the arcuate path of travel of the switching element between the reeds 92 and 94, a cam follower 104 is provided to contact the helical bead 52 of the cam 48 which, in turn, when riding up and over the bead will actuate the switching element engaging tip 106.

It is to be understood that the embodiments of the invention shown herein are by way of example only and are not to be construed in a limiting sense. It is believed that the foregoing discussion and illustrations enable those skilled in the art to practice the invention; and that other arrangements and modifications will occur to those guided by the teaching of this invention and may be resorted to without departing from the scope of the invention.

We claim:

1. In an automation control device for use in combination with machines having repetitive cycles of operation such as industrial presses and the like, the improvement comprising: a base plate; a shaft rotatably mounted in said base plate to extend normally therefrom; a helical cam secured to said shaft for rotation therewith; a plurality of ways secured to said base and disposed radially about said helical cam, said ways projecting outwardly from said base parallel to the axis of rotation of said helical cam; a like plurality of switching elements slidably secured in said ways; switching element adjusting members mounted in said base plate to extend normally therethrough for engagement with adjacent switching elements, whereby said switching elements are axially positionable individually with respect to said helical cam for actuation thereby in a predetermined sequential order.

2. The automation control device set forth in claim 1 wherein each of said switching element adjusting members comprises a micrometer-type thread adjustment means including a non-rotatable sleeve secured in said base plate and provided with internal threads throughout; a second sleeve internally and externally threaded, the external threads being adapted to mate with the internal threads of the said non-rotatable sleeve; and a stud threadedly received within said second sleeve to non-rotatably engage one of said switching elements, whereby rotation of said second sleeve advances said second sleeve in said non-rotatable sleeve and differentially advances said stud against said switching element.

3. The automation control device set forth in claim 1, wherein said base plate is provided with a dial face concentric with said shaft, and a hand secured to said shaft and positioned to sweep said dial, whereby a visual indication is provided of the cyclic position of said cam with respect to the said switching elements.

4. The automation control device set forth in claim 1, including a second shaft normal to said first mentioned shaft and drivingly connected thereto for tandem operation of like automation control devices.

5. The automation control device set forth in claim 1, wherein said adjusting members each comprise a threaded shaft threadedly received in said base plate, having rotating means on one end and switching element engaging means on the opposite end, whereby rotation of said rotating means moves an adjacent connected switching element in said ways, and counter-rotation of said rotating means reverses the movement of said switching element.

6. The automation control device set forth in claim 5, wherein said rotating means comprise knobs having dial faces matching with indicia on said base plate to provide visual indication of the settings of said switching elements with respect to their sequential cyclic operation.

7. In an automation control device for use in combination with machines having repetitive cycles of operation such as industrial presses and the like, the improvement comprising: a base plate; a shaft rotatably journaled in said base plate to extend normally therefrom; journal means on the end of said shaft remote from said base; a helical cam secured to said shaft for rotation therewith; a plurality of reeds secured to said base and radially aligned concentric with said shaft; a second and like plurality of reeds secured to said journal means and radially aligned concentric with said shaft; switching elements secured between the outer ends of said first and second mentioned plurality of reeds; switching element adjusting members mounted in said base plate to extend normally therethrough for engagement with the outer ends of said first mentioned plurality of reeds, whereby said switching elements are axially positionable individually with respect to said helical cam for actuation thereby in a predetermined sequential order.

8. The automation control device set forth in claim 7, wherein each of said switching element adjusting members comprises a micrometer-type thread adjustment means including a non-rotatable sleeve secured in said base plate and provided with internal threads throughout; a second sleeve internally and externally threaded, the external threads being adapted to mate with the internal threads of the said non-rotatable sleeve; and a stud threadedly received within said second sleeve to non-rotatably engage the outer end of one of said first mentioned plurality of reeds, whereby rotation of said second sleeve advances said second sleeve in said non-rotatable sleeve and differentially advances said stud against said reed.

References Cited in the file of this patent
UNITED STATES PATENTS

| | | |
|---|---|---|
| 1,242,260 | Stone | Oct. 9, 1917 |
| 1,801,129 | Warren | Apr. 14, 1931 |
| 1,813,780 | Tuttle | July 7, 1931 |
| 1,836,973 | Jacobson et al. | Dec. 15, 1931 |
| 1,881,719 | Leach | Oct. 11, 1932 |
| 2,454,882 | Oakley | Nov. 30, 1948 |
| 2,471,318 | Fitzsimmons et al. | May 24, 1949 |